May 26, 1931.    F. L. VAN WEENEN    1,806,770
DEVICE FOR INJECTING LIQUID UNDER PRESSURE
Filed Dec. 4, 1926

Inventor:
Franciscus L. van Weenen

Patented May 26, 1931

1,806,770

UNITED STATES PATENT OFFICE

FRANCISCUS L. van WEENEN, OF ROTTERDAM, NETHERLANDS, ASSIGNOR OF ONE-HALF TO CORNELIS FRANCISCUS MARIA van BERKEL, OF WASSENAAR, NETHERLANDS

DEVICE FOR INJECTING LIQUID UNDER PRESSURE

Application filed December 4, 1926, Serial No. 152,713, and in Belgium December 30, 1925.

This invention relates to devices for injecting liquid under pressure, as, for example, the injection of lubricating oil into the parts to be lubricated or for the operation of hydraulic brakes or the injection of liquid fuel.

The object of the invention is to provide a device for increasing the pressure of the injected liquid which shall be simple and compact in construction, economical to manufacture, and efficient in operation.

Other objects will appear from the following description.

The invention is exemplified in the combination and arrangement of parts shown in the accompanying drawings and described in the following specification, and it is more particularly pointed out in the appended claims.

In the drawings,—

Figure 1:
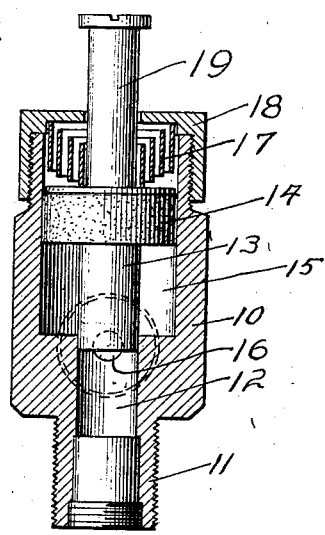
Fig. 1 is an elevation of a liquid injector showing one embodiment of the present invention.
Figure 2:
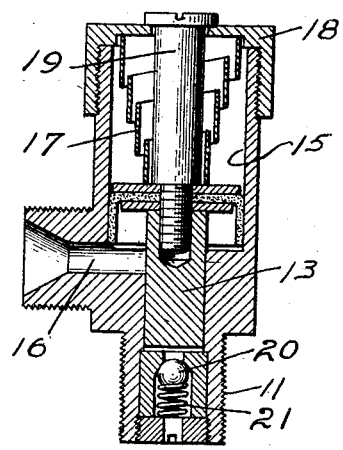
Fig. 2 is a section at right angles to the section shown in Fig. 1, with the parts in a different position.

The embodiment of the invention illustrated is that employed for injecting lubricating oil into bearings such as the bearings and other parts of an automobile requiring lubrication. The various injector units are applied directly to the part to be lubricated and are connected in parallel by suitable tubing with a force pump or other apparatus for supplying lubricating oil under pressure to the various injector units. Each unit, as shown in Figs. 1 and 2, comprises a body member 10 having a threaded shank 11, which may be attached to the bearing to be lubricated in the manner of an ordinary grease cup. The part 10 is bored to form a cylindrical opening 12 having a plunger 13 arranged to reciprocate therein. A piston 14 is secured to the upper end of the plunger 13 and is arranged to reciprocate in a cylindrical chamber 15. A passage 16 communicates with the cylindrical openings 12 and 15 and is connected by suitable piping with the pump for supplying lubricating fluid to the injectors. A spring 17 bears on the upper surface of the piston 14 and has its upper end engaged by a cap 18, which covers the top of the body member 10. A screw 19 is threaded into the top of the plunger 13 and holds the piston 14 in place on the plunger. The screw 19 extends upwardly through an opening in the cap 18 and the head of the screw closes the opening when the piston is in its inoperative position as shown in Fig. 2.

When pressure is exerted on the lubricating oil in the passage 16 the piston 14 will be lifted against the force of the spring 17, compressing the spring into the position shown in Fig. 1. This will uncover the end of the opening 16 and admit oil into the chamber 12. When the pressure in the passage 16 is relieved the entire force of the spring 17 will be exerted by the end of the plunger 13 on the lubricating oil in the chamber 12 and force the oil from the bottom of the chamber into the bearing to be lubricated. If desired, a ball valve 20 may be located in the passage between the chamber 12 and the bearing to permit passage of the lubricating material in one direction only. The area of the plunger 13 is much less than the area of the piston 14 so that the pressure exerted by the plunger 13 to inject oil into the bearing will be much greater than the original pressure exerted by the pump. Where the valve 20 is employed and the spring 21 which holds the valve in place is of sufficient strength to resist opening of the valve under the pressure of the pump, it will be possible to inject only a definite limited quantity of lubricating material at each operation of the pump. If any oil leaks back past the plunger 13 under the high pressure exerted by the plunger, the oil will be returned to the lubricating system and will not be lost or permitted to leak out onto the exposed surface of the apparatus being lubricated. The screw 19 makes it possible to observe the operation of the injector and to determine whether or not it is properly operated. By varying the length of the screw the stroke of the injector may be changed to permit the injector to discharge any quantity of lubricating material desired at each operation.

Figure 3:
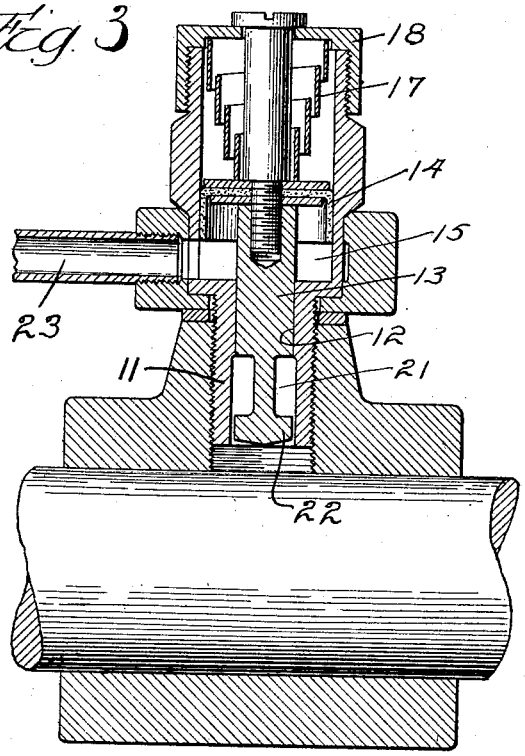
Fig. 3 is a view similar to Fig. 1, showing a modified form of the invention applied to a bearing to be lubricated.
Figure 4:
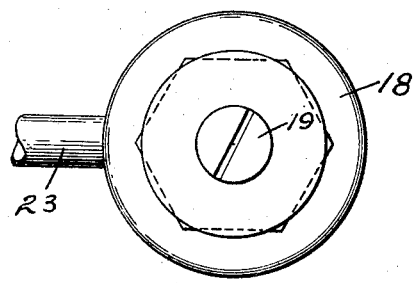
Fig. 4 is a top plan view of the device shown in Fig. 3.

In the form of the invention shown in Figs. 3 and 4 the operating parts are similar to those described in connection with Figs. 1 and 2. The lower end of the plunger 13, however, is provided with a recess 21, leaving a head 22 at the end of the plunger of a size to close the lower end of the chamber 12. The chamber 12 is defined by that part of the body 10 which acts as a bearing for the plunger 13. The lower portion of the opening in the threaded shank 11 is slightly larger in diameter than the head 22 to permit the lubricating material to pass around the head 22 into the bearing. When the oil under pressure is supplied through the tube 23 the piston 14 will be lifted as previously explained and the top end of the recess 21 will be brought into communication with the opening 15. This will permit the recess 21 to be filled with oil. At this time the head 22 will close the lower end of the chamber 12 so that only a definite quantity of oil can enter the recess 21. After the pressure has been relieved in the tube 22, the spring 17 will force the plunger 13 downwardly in the manner previously described and discharge a quantity of oil into the bearing equal to the capacity of the recess 21. This arrangement avoids the necessity of a special ball valve 20 and does not require the pressure in the supply to be regulated with respect to the strength of the spring for closing the ball valve.

I claim:

1. A device for injecting lubricant under pressure comprising a plunger having two pressure faces of different areas, a spring for moving said plunger in one direction toward the smaller end thereof, means for subjecting the larger of said pressure faces to fluid pressure from the lubricant to move said plunger against the force of said spring, and means for supplying lubricant to be acted on by the smaller of said pressure faces.

2. A device for injecting fluid under pressure comprising a reciprocating plunger, a spring for moving said plunger in one direction, a piston connected with said plunger having a greater active surface area than the active surface area of said plunger, and means for subjecting the active area of said piston to fluid under pressure to move said piston to compress said spring, the movement of said piston operating to admit a portion of said fluid into position to be acted on by said plunger at a pressure greater than said first-named pressure when the pressure of said fluid is relieved to release said spring, said fluid being admitted to act on said plunger and piston through the same opening.

3. A device for injecting fluid under pressure comprising a body member having a chamber therein, a plunger arranged to reciprocate in said chamber, said body member having a port for admitting fluid under pressure into said chamber when said plunger is retracted, a spring for moving said plunger in a direction to discharge fluid from said chamber, a piston having greater active area than said plunger for moving said plunger against the force of said spring, and means for supplying fluid under pressure to operate said piston and to enter said port when said plunger has been retracted by the operation of said pressure fluid on said piston.

4. A device for injecting fluid under pressure comprising a body member having chambers of different diameters therein and having an opening through one end thereof communicating with one of said chambers, a piston having a plunger connected thereto, said piston and plunger being arranged to reciprocate in their respective chambers, means for establishing communication between said chambers when said piston is moved toward said opening, a spring for moving said piston away from said opening, and a bar connected with said piston and extending through said opening and having an enlargement on the outer end thereof for closing said opening when said piston is moved to the limit of its travel by said spring.

5. A device for injecting fluid under pressure comprising a body member having chambers of different diameters therein, a piston having portions of different diameters snugly fitting and arranged to reciprocate in their respective chambers, said body member having an opening in one end thereof communicating with one of said chambers, means for establishing communication between said chambers when said piston is moved toward said opening, a spring for moving said piston away from said opening, and a screw threaded in said piston and extending through said opening and having a head on the outer end thereof for limiting the movement of said piston by said spring.

6. A device for injecting fluid under pressure comprising a body member having a chamber therein, a piston arranged to reciprocate in said chamber, a plunger connected with said piston, said body member having a smaller chamber in which said plunger reciprocates, means for introducing fluid under pressure into said first-named chamber to move said piston and plunger in one direction to establish communication between said chambers and admit a portion of said fluid to said smaller chamber, and a spring for returning said plunger and piston to cause said plunger to discharge the fluid from said smaller chamber.

7. Means for injecting fluid under pressure comprising a body member having connected chambers of different sizes therein, a piston arranged to reciprocate in the larger of said chambers, a plunger connected with said piston and arranged to reciprocate in the smaller of said chambers to close said smaller chamber when in one position but movable into a different position to establish communication between said chambers, means for introducing fluid under pressure to move said piston in one direction into the position in which communication is established between said chambers so that a portion of said fluid enters said smaller chamber, and a spring for returning said piston and plunger to cause said plunger to discharge the fluid from said smaller chamber.

8. A device for injecting lubricant under pressure comprising a body member having two chambers of different diameters, the larger of said chambers being a cylinder, a piston mounted to reciprocate in said cylinder, a plunger connected with said piston and adapted to reciprocate in the smaller of said chambers, a spring to urge said plunger into said smaller chamber, said body member having an opening to admit fluid pressure into said body beneath said piston, said opening communicating with said chambers near the bottom of said larger chamber and beneath said piston, the communication of said opening with said smaller chamber being closed by said plunger until said plunger is raised to uncover said opening communicating with said smaller chamber.

9. A device for injecting fluid under pressure comprising a spring held member, fluid pressure actuated means associated with said member, means through which lubricant may be introduced under pressure to directly act upon said fluid pressure actuated means and move said member against the force of its spring, said member being operable by said spring to exert pressure upon the fluid to be injected, the area of the operating surface of said member being less than the active surface of said fluid pressure actuating means, the fluid which actuates said fluid actuated means being also the fluid acted upon by said member.

10. A device for injecting lubricant under pressure comprising a plunger having two pressure faces of different areas, a spring for moving said plunger in a direction towards the smaller end thereof, means for subjecting the larger of said pressure faces to fluid pressure from the lubricant to move said plunger against the force of said spring, detachable means for limiting the movement of said plunger under the action of said spring, said detachable means being made detachable so as to permit similar means of different dimensions to be inserted in place thereof to vary the amount of movement of said plunger, and means for supplying the lubricant to be acted upon by the smaller of said pressure faces.

11. A device for injecting lubricant under pressure comprising a casing, a lubricant pressure conduit connected to said casing and communicating with the interior thereof, a plunger adapted to reciprocate in said casing, said plunger having two pressure faces of different areas, means for moving the plunger in a direction towards the smaller end thereof, means for subjecting the larger of said pressure faces to the pressure of the lubricant in said conduit to move said plunger against the force of said first mentioned means, and means for supplying the lubricant to a position where it will be acted upon by the smaller of said pressure faces.

In testimony whereof I have signed my name to this specification on this 27th day of October, A. D. 1926.

FRANCISCUS L. v. WEENEN.